United States Patent [19]

Crosbie et al.

[11] Patent Number: 4,534,338

[45] Date of Patent: Aug. 13, 1985

[54] SERVO OPERATED ANTI-G SUIT PRESSURIZATION SYSTEM

[75] Inventors: Richard J. Crosbie, Langhorne; Paul R. Edwards, Chalfont, both of Pa.

[73] Assignee: The United States of America as represented by the Secretary of the Navy, Washington, D.C.

[21] Appl. No.: 613,497

[22] Filed: May 24, 1984

[51] Int. Cl.$^3$ ............................................. A61F 5/37
[52] U.S. Cl. ..................................... 128/1 A; 137/38
[58] Field of Search ................... 128/1 A, 30.2, 40; 137/38, 39

[56] References Cited

U.S. PATENT DOCUMENTS

| | | | |
|---|---|---|---|
| 3,780,723 | 12/1973 | Van Patten et al. | 128/1 A |
| 4,219,039 | 8/1980 | Jaggars | 137/38 |
| 4,243,024 | 1/1981 | Crosbie et al. | 128/1 A |
| 4,336,590 | 6/1982 | Jacq et al. | 364/418 |

Primary Examiner—G. L. Kaplan
Assistant Examiner—W. T. Leader
Attorney, Agent, or Firm—Robert F. Beers; Henry Hansen; Vincent T. Pace

[57] ABSTRACT

A servo operated system for controlling pressurization of an aircraft pilot's anti-G suit during high energy maneuvers has a servo operated control valve and a feedback loop controller for minimizing pressure lag in the suit. The controller has dual modes of operation: one for normal flight conditions and one for combat flight conditions. The normal flight mode provides nominal G-protection while the combat mode provides faster response by prepressurizing the anti-G suit to a base level and lowering the G-force threshold. While in the combat mode, the crewman may select an adjustable pulsating signal to be superimposed on the prepressurization level to obtain additional comfort. Alternatively, he may select a superimposed pulsating signal which is synchronized with his own heartbeat to reinforce the pumping action of the heart.

11 Claims, 2 Drawing Figures

SERVO OPERATED ANTI-G SUIT PRESSURIZATION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to acceleration protective suits for pilots, and more particularly to an improved valve for controlling pressurization of such anti-G suits.

The current generation of fighter/attack aircraft has aerodynamic, structural, and propulsion systems tailored for high energy maneuvering. This high energy maneuvering capability provides the pilot with the tactical advantage required to maintain air superiority but challenges his ability to fully use this capability because of the high accelerative forces associated with it. These forces effectively increase the weight of the pilot's blood which is equivalent to lengthening his cardiac cerebral hydrostatic column; this places a heavy burden on his heart as it attempts to overcome the weight of this column and supply oxygenated blood to the brain. Failure of the heart to perform this function causes the pilot to experience a loss of vision, a failure of cognitive processing, and eventually a loss of consciousness.

To increase the pilot's ability to withstand these accelerative forces, he is provided with an anti-G suit containing bladders which inflate under control of an anti-G valve and applies pressure over the abdominal and leg areas. Further protection is provided if the pilot performs a straining maneuver in combination with the suit pressurization. Critical to the amount of protection provided by these actions, however, is the time at which they occur relative to the G profile. If the suit is pressurized too early, the pilot may experience pain and discomfort which may inhibit his straining maneuver. If it is pressurized too late, blood pooling in the lower extremities may have already occurred and created a condition which the eventual suit pressurization may not be able to overcome. Ideally, the suit should be pressurized in synchrony with the increasing G profile.

The standard anti-G valve with the widest current use has had no basic improvements since it was developed during World War II. This valve is basically a spring loaded mass system which controls the anti-G suit pressure by the action of an applied G-force which opens and closes the valve by displacing the mass. The opening of the valve is directly proportional to the amount by which the longitudinal component of the G-force exceeds a preset threshold.

This open-loop proportional method of control introduces an inherent lag between the applied G-force and the suit pressure which is particularly noticeable during high rates of G onset, a common occurrence in modern high performance aircraft. Consequently, the pilot may be left with the task of combatting high G-forces without assistance from his suit, thereby reducing his tolerance to G-forces, adding to his stress and fatigue, and diminishing his mission effectiveness.

A modified version of the standard anti-G valve has been developed which achieves an increase in the rate of G-suit pressurization. Two concepts are utilized to accomplish this objective: (a) the suit is prepressurized to a nominal pressure, and (b) the port size of the valve is increased thereby increasing the pressurizing air volume through the valve.

There are, however, some disadvantages to this modified valve. For example, suit prepressurization can be uncomfortable for pilots for long periods of time and will require provisions for being switched on and off. Also, the increase in air flow capacity is limited to the maximum capacity of the standard G-valve design. Furthermore, the basic problems associated with the standard valve, previously discussed, still remain.

Finally, it would be very advantageous to be able to study a pilot's physiological response to G-stress under various conditions of G-suit pressurization. This is virtually impossible with the standard valve, since it only has one possible mode of operation. A valve which can be adapted to respond to different parameters would not only provide greater flexibility in research, but also provide greater effectiveness and comfort for the pilot.

SUMMARY OF THE INVENTION

Accordingly, one object of this invention is to rapidly pressurize a pilot's anti-G suit in response to onset of accelerative forces resulting from high energy aircraft maneuvering.

Another object of this invention is to make the pressurizing valve of an anti-G directly responsive to both G-force onset and suit pressure.

Another object of the invention is to minimize pressure lag in pressurizing the anti-G suit after G-force onset.

Yet another object of this invention is to maximize air flow capacity to the anti-G suit when required.

A further object of this invention is to optimize anti-G suit response and comfort under both normal and combat flight conditions.

A still further object of this invention is to relieve pilot tension and stimulate blood circulation during extended combat flights.

A still further object of this invention is to provide a measure of anti-G suit pressure as a feedback signal without modifying the suit itself.

The above and other objects are realized in the subject invention by a servo-operated control valve which controls the air pressure to the anti-G suit. The control signal for the servo-operated valve is generated by a control circuit which has two operational modes: one for normal flight conditions and one for combat flight conditions.

In the normal flight mode a differential amplifier receives a signal indicative of G-force onset when its magnitude is greater than a predetermined threshold. The amplfier also receives a feedback signal which is indicative of the outlet pressure of the control valve. Based on these signals the amplifier outputs a control signal to the servo-operated control valve.

In the combat flight mode the amplifier receives the same input signals, except that the threshold is lowered and the feedback signal is modified to represent the pressure response of the anti-G suit. Additionally, pre-pressurization signal is input to the differential amplifier to pressurize the anti-G suit to a predetermined bias level. Also in this mode, the pilot may select to have a periodic signal input to the amplifier to modulate the air flow to the anti-G suit. Moreover, the pilot may also select to synchronize this modulation signal with his own pulse by means of EKG sensors in the pilot's flight suit.

To further improve blood circulation during high energy combat maneuvers means are provided to sequentially pressurize the air bladders in the anti-G suit. This sequential pressurization, from the legs to the thighs then to the abdomen provides a "milking action" which aids the heart in pumping blood to the head and upper body.

Other advantages and novel features of the invention will become apparent from the detailed description of the invention which follows the drawings wherein:

DETAILED DESCRPTION OF THE INVENTION

Figure 1:
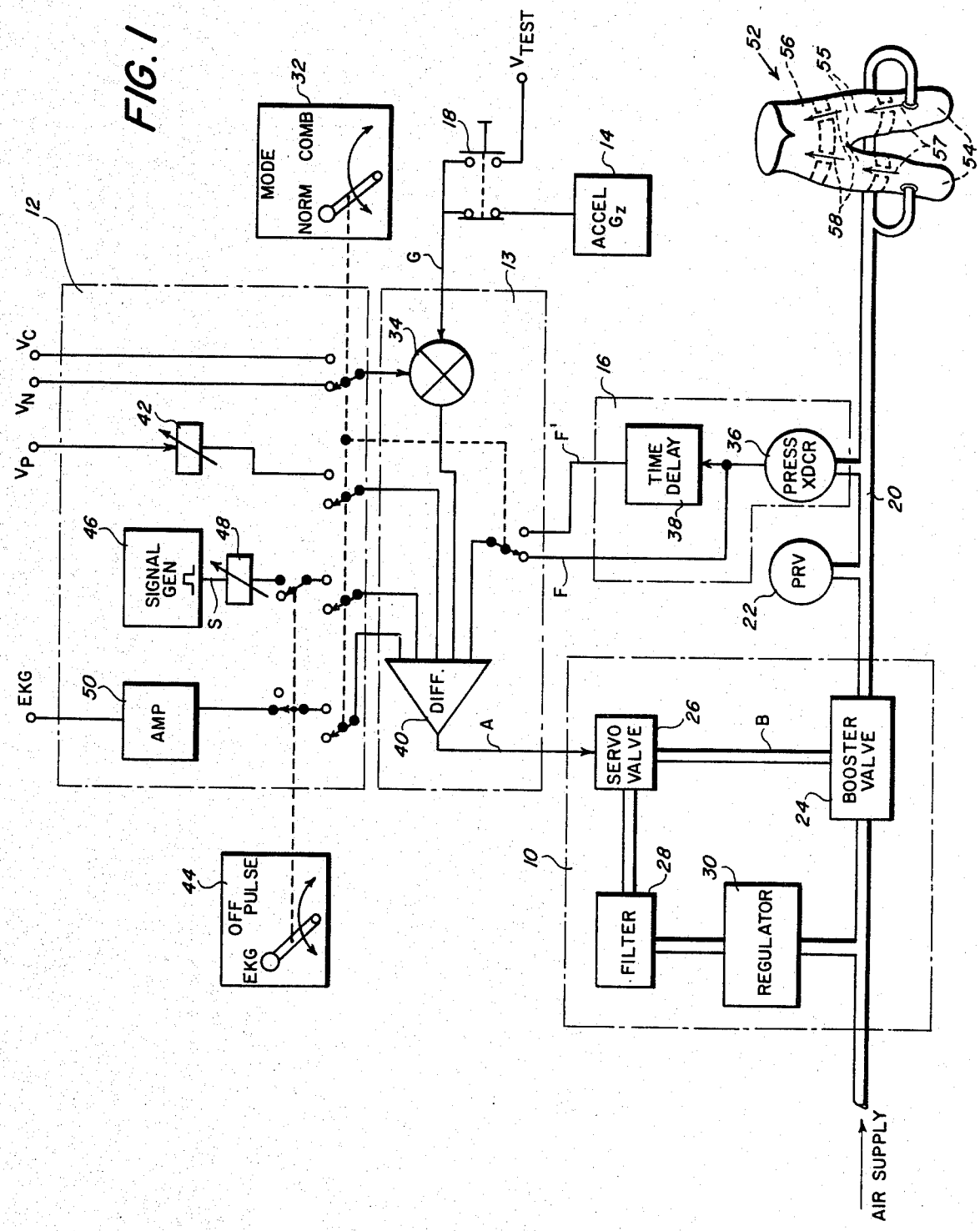
FIG. 1 illustrates an embodiment of an anti-G suit pressurization system according to the present invention.

Referring now to FIG. 1, the embodiment of the anti-G suit pressurization system shown therein generally includes a servo-operated control valve 10 and a multiparameter controller 12 which provides a control signal A to the servo-operated control valve 10.

Control valve 10 is connected in a supply line 20 from a regulated air supply to the anti-G suit 52. In the embodiment shown in FIG. 1 the control valve 10 includes a pneumatically operated booster valve 24 for boosting or throttling the air supply to the anti-G suit 52. A servo valve 26 receives signal A from controller 12 and provides a pneumatic signal B to booster valve 24. The control air for generating the pneumatic signal is provided to the servo valve 26 through a filter 28 and regulator 30. The control air may be taken from the same regulated air source which supplies the anti-G suit 52.

Although the embodiment shown in FIG. 1 has a pneumatically actuated control valve 10, other types of servo mechanisms may be used. For example, a motorized servomechanism mechanically linked to a mechanically operated booster valve could be utilized in place of the pneumatic servo valve. Likewise, it might be advantageous in some circumstances to use a hydraulically actuated servo mechanism to operate the booster valve 24. However, when speed of response is an essential operating criterion of the pressurization system, a pneumatic system is generally preferred.

The multiparameter controller 12 has two modes of operation: NORMAL for normal flight conditions and COMBAT for combat flight conditions. The desired mode is selected by means of a gang operated switch 32. When switch 32 is positioned in the NORMAL mode, controller 12 receives input signals from an accelerometer 14, a voltage source $V_N$, and a pressure transducer 36.

Accelerometer 14, which may be integral with control valve 10 or separate therefrom, measure vertical accelerations or G-forces and provides an electrical signal G, proportional thereto. Signal G is input to a comparator 34 where it is compared with $V_N$, a voltage signal which is representative of a predetermined threshold G-force. When signal G exceeds $V_N$ then it is transmitted to differential amplifier 40. Comparator 34 continues to transmit signal G as long as it remains above $V_N$. In the embodiment shown in FIG. 1 a pushbutton switch 18 is provided to connect a test signal $V_{TEST}$ into the control circuitry for testing operation of the system prior to the aircraft getting airborne.

Pressure transducer 36 is connected to supply line 20 on the outlet side of control valve 10 so that it effectively monitors the air pressure input to the anti-G suit 52. Transducer 36 provides a feedback signal F to differential amplifier 40. Signal A represents the difference of signals G and F, and energizes servo valve 26 appropriately to increase or decrease the air supplied to anti-G suit 52. The gain of amplifier 40 may be adjusted for minimum pressure lag and maximum loop stability. A pressure relief valve 22 is also connected to supply line 20 in order to prevent the anti-G suit 52 from being pressurized above a predetermined limit.

In the COMBAT mode, switch 32 is operated to connect a different set of input signals to amplifier 40. Specifically, a voltage signal $V_C$ is applied to comparator 34. $V_C$ is representative of a predetermined threshold G-force which is somewhat lower than that represented by $V_N$. This lower threshold, or break-out signal permits more rapid response of the control valve 10.

Also, signal F from pressure transducer 36 may be routed through a time delay circuit 38 to provide feedback signal F' to amplifier 40 which is representative of the pressure in the anti-G suit 52. Utilization of this time delay eliminates the need for a transducer mounted in the anti-G suit 52 itself. Circuit 38 generally consists of any electrical circuit capable of delaying the output of an input signal by an appropriate time constant. The time constant is effectively the time lag between a pressure change at the outlet of control valve 10 and the corresponding pressure change in the anti-G suit 52. This time constant may be determined empirically, or by control system analysis, since the pressurization control loop represents a first order system having the transfer function:

$$1/(Ts+1),$$

where T is the time constant. Another method of accomplishing the same result would be to provide means for automatically increasing the gain of differential amplifier 40 when signal G attains a predetermined magnitude thereby speeding up the response of the control valve 10.

Additionally, in the COMBAT mode, a voltage signal $V_p$ is input to amplifier 40 of controller 12. $V_p$ is representative of a pressure level to which the anti-G suit 52 is to be prepressurized. This establishes a nominal or bias pressure which decreases the response time of the system to onset of G-forces. The amplitude of the prepressurization signal may be adjusted by means of a potentiometer 42 for varying the magnitude of $V_p$.

While in the COMBAT mode of operation the pilot has the option of moving switch 44 to the PULSE position in order to initiate a pulsing pressure in his anti-G suit 52, thereby relieving tension and stimulating blood circulation during long flight hours. This pulsating pressure is produced by a signal generator 46 capable of generating a pulsed or stepped voltage signal S for input to differential amplifier 40. This has the effect of modulating control signal A. The amplitude of signal S may be adjusted by means of potentiometer 48.

The pilot also has the option of moving switch 44 to the EKG position, thereby connecting an amplified electrocardiogram signal EKG from electrodes attached to his person to amplifier 40. Signal EKG likewise modulates signal A, but in synchronism with the pilot's own heartbeat to provide greater margins of comfort and G protection. The amplitude of signal EKG may be controlled by adjustment of the gain of amplifier 50.

It is to be understood that in operation the signals S or EKG are superimposed on the prepressurization level $V_p$. Likewise, signals S or EKG would be superimposed on any response signal to a G-force level sufficient to activate comparator 34. Of course, the pilot may choose to eliminate any pulsating pressure by moving switch 44 to the OFF position.

As a supplement to the above described pressure control apparatus the anti-G suit 52 may be modified to include means for sequentially pressurizing the leg bladders 54, thigh bladders 55, and the abdominal bladder 56 therein. Restrictive passageways 57 interconnect the leg bladders 54 with the thigh bladders 55, and restrictive passageways 58 interconnect the thigh bladders 55 with the abdominal bladder 56. Supply line 20 is connected to the leg bladders 54 only. The passageways 57 are constructed such that the thigh bladders 55 will inflate only after the leg bladders are inflated. Likewise, passageways 58 are constructed such that abdominal bladder 56 will inflate only after thigh bladders 56 are inflated.

Figure 2:
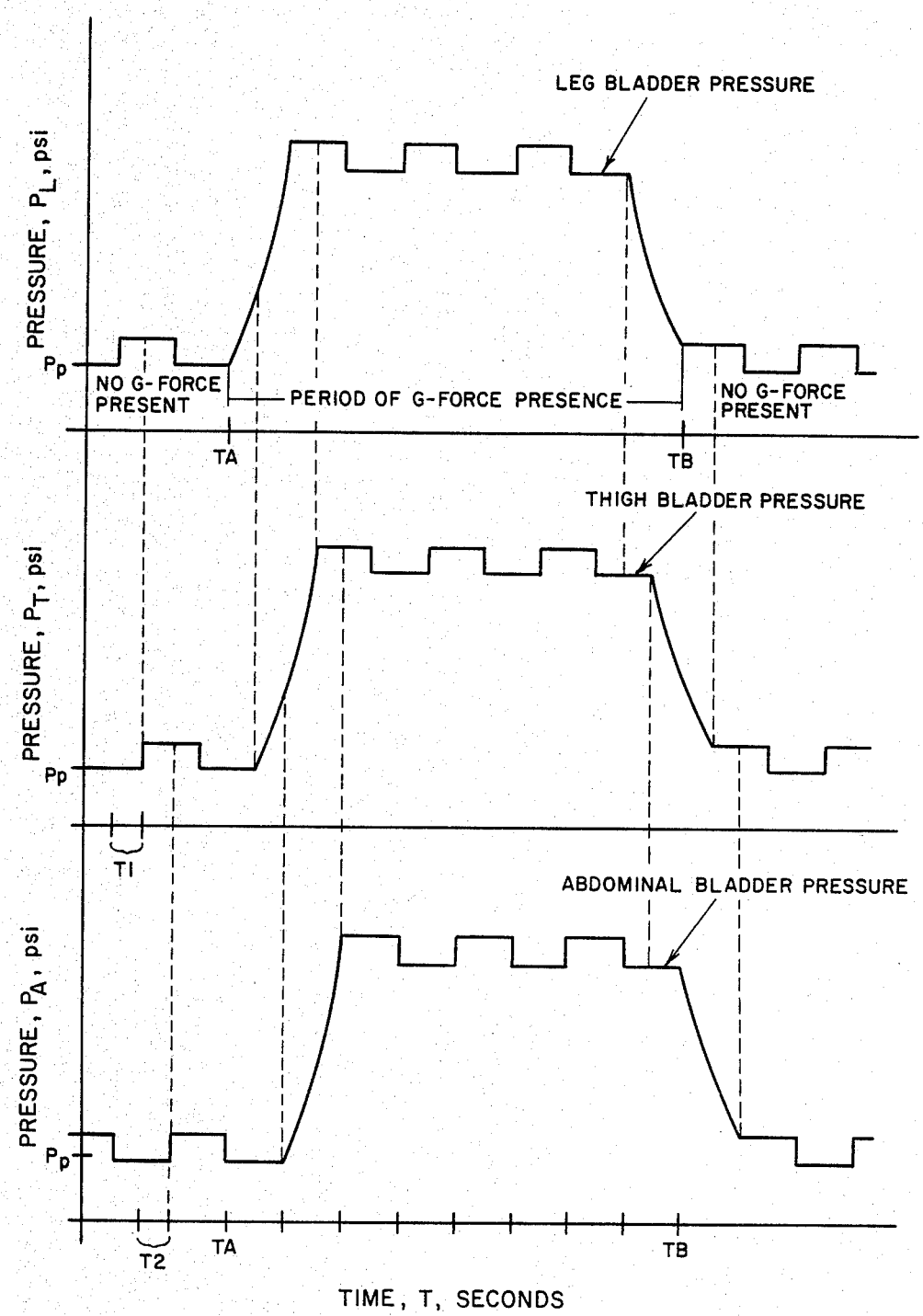
FIG. 2 shows representative graphs of the pressure in the anti-G suit air bladders as a function of time, illustrating the sequential pressurization of the air bladders.

FIG. 2 illustrates the sequential pressurization in graphs of pressure vs. time for each of the air bladders 54, 55, and 56 in anti-G suit 52 of FIG. 1. The uppermost graph represents the air pressure in the leg bladders 54. In the time interval preceding time TA the pressure signal consists of the pulsed pressure due to either the signal generator 46 or the EKG signal superimposed on the bias pressure $P_p$ due to the prepressurization signal $V_p$.

The middle graph represents the air pressure in the thigh bladders 55. As can be seen, the thigh bladder pressure lags the leg bladder pressure by an amount T1 due to the function of the restrictive passageways 57. Likewise, the bottom graph represents the air pressure in the abdominal bladder 56. The pressure in abdominal bladder 56 lags the thigh bladder pressure by an amount T2. Of course, the amount of lag may be adjusted by changing the width of the restrictive passageways 57 and 58. Wider passageways will shorten the lag time, while narrower passageways would increase the lag time.

This sequential pressurization of the anti-G suit bladders 54, 55, and 56 results in a "milking action" which reinforces the pumping action of the pilot's own heart. When swtich 44 is in the EKG position this sequential pressurization functions in phase with the pilot's heart since the period of the pressure pulses would be the same as his pulse rate.

In the interval between time TA and time TB, in FIG. 2, a G-force is sensed and the control valve 10 has responded by increasing the air pressure to the anti-G suit 52. As can be seen and as previously discussed, the pulsations due to the EKG or Signal Generator 46 are superimposed on the pressure signal response. The responding pressurizations of the thigh and abdomnal bladders 55 and 56 are correspondingly delayed from the pressurization of the leg bladders 54.

Of course, when the G-force is no longer present, e.g. after time TB, the pressurization of the anti-G suit bladders 54, 55, and 56 respectively return to the steady state pressurization, as in the time before TA.

Some of the many advantages and features of the subject invention should now be apparent in view of the above teachings. For example, a system has been described for rapidly pressurizing an aircraft pilot's anti-G suit in response to onset of acceleration forces due to high energy maneuvers. The system utilizes a servo operated control valve which is responsive to incident G-forces and a feedback signal representative of the actual suit pressure. Furthermore, the control system described has dual modes of operation. Under combat flight conditions additional parameters are input to the controller in order to increase pilot comfort and aid his cardiovascular system. Under normal flight conditions nominal G-protection is provided.

Numerous modifications and variations of the subject invention are possible in light of the above teachings. For example, instead of manual switching between the dual modes of operation the aircraft computer could be programmed to switch the various input signals in response to certain preselected parameters. This would relieve the pilot of a manual function which he might not have time to perform. It is therefore to be understood that within the scope of the appended claims the invention may be practiced otherwise than as specifically described.

What is claimed is:

1. In an aircraft, a system for rapidly pressurizing and controlling pressurization of an aircrewman's anti-G suit, of the type, having a plurality of inflatable air bladders, comprising:
   an accelerometer for providing a signal representative of G-forces incident along the vertical axis of the aircraft;
   means for switching between two system operating modes, the first operating mode providing a first set of input signals, and the second operating mode providing a second set of input signals different from the first set;
   multiple input control means responsive to the G-force signal and the first or second set of input signals for providing a control signal;
   a control valve responsive to the control signal and formed to be connected for controlling the volume of air supplied to the anti-G suit; and
   means responsive to the air pressure supplied to the anti-G suit and formed to be connected at the outlet of said control valve, for providing a feedback signal connectable through said switching means to said control means.

2. A system as recited in claim 1 wherein the mode switching means comprises:
   a gang operated, multi-pole, double throw switch;
   first means connected to said switch for providing a threshold signal representative of a threshold G-force;
   second means connected to said switch for providing an adjustable prepressurized signal in the second operating mode; and
   third means connected to said switch for providing an adjustable modulating signal in the second operating mode.

3. A system as recited in claim 2 wherein the threshold signal has one valve in the first operating mode and a lower value in the second operating mode.

4. A system as recited in claim 3 wherein the adjustable prepressurization signal means comprises:
   a direct current voltage source; and
   means for adjusting the amplitude of said voltage source.

5. A system as recited in claim 4 wherein the modulating signal means comprises:
   a signal generator for providing a periodic pulsed signal; and
   means for adjusting the amplitude of the periodic pulsed signal.

6. A system as recited in claim 5 wherein the modulating signal means further comprises:
   an amplifier connected to receive a signal indicative of the aircrewman's pulse for providing an amplified EKG signal;
   means for adjusting the amplitude the EKG signal; and
   means for selectively connecting said signal generator or said amplifier to said mode switching means.

7. A system as recited in claim 6 wherein the multiple input control means comprises:
   comparator means connected to receive the G-force representative signal and the threshold signal for transmitting the G-force signal when it exceeds the threshold signal value; and
   a differential amplifier connected to receive the G-force signal, the prepressurized signal, the modulating signal, and the feedback signal, for providing the control signal.

8. A system as recited in claim 7 further comprising a pressure relief valve for preventing pressurization of the anti-G suit above a predetermined level.

9. An anti-G suit pressurization system as recited in claim 8 further comprising:
   means for providing sequential pressurization of the air bladders in the anti-G suit.

10. A system as recited in claim 1 wherein the control valve comprises:
    a pneumatically actuated volume booster valve formed to be connected in the air supply line to the anti-G suit;
    a servo-valve responsive to the control signal and formed to provide a pneumatic signal from the air supply to said volume booster valve; and
    means for regulating and filtering the air supply to said servo-valve.

11. A system as recited in claim 1 wherein the feedback signal means comprises:
    a pressure transducer formed to be connected at the outlet side of said control valve, and having its signal side connectable through said mode switching means to said multiple input control means in the first operating mode; and
    a time delay circuit connected to the signal side of said pressure transducer, said time delay circuit being connectable through said mode switching means to said multiple input control means in the second operating mode, whereby a pressure feedback signal is provided to said control means.

* * * * *